UNITED STATES PATENT OFFICE.

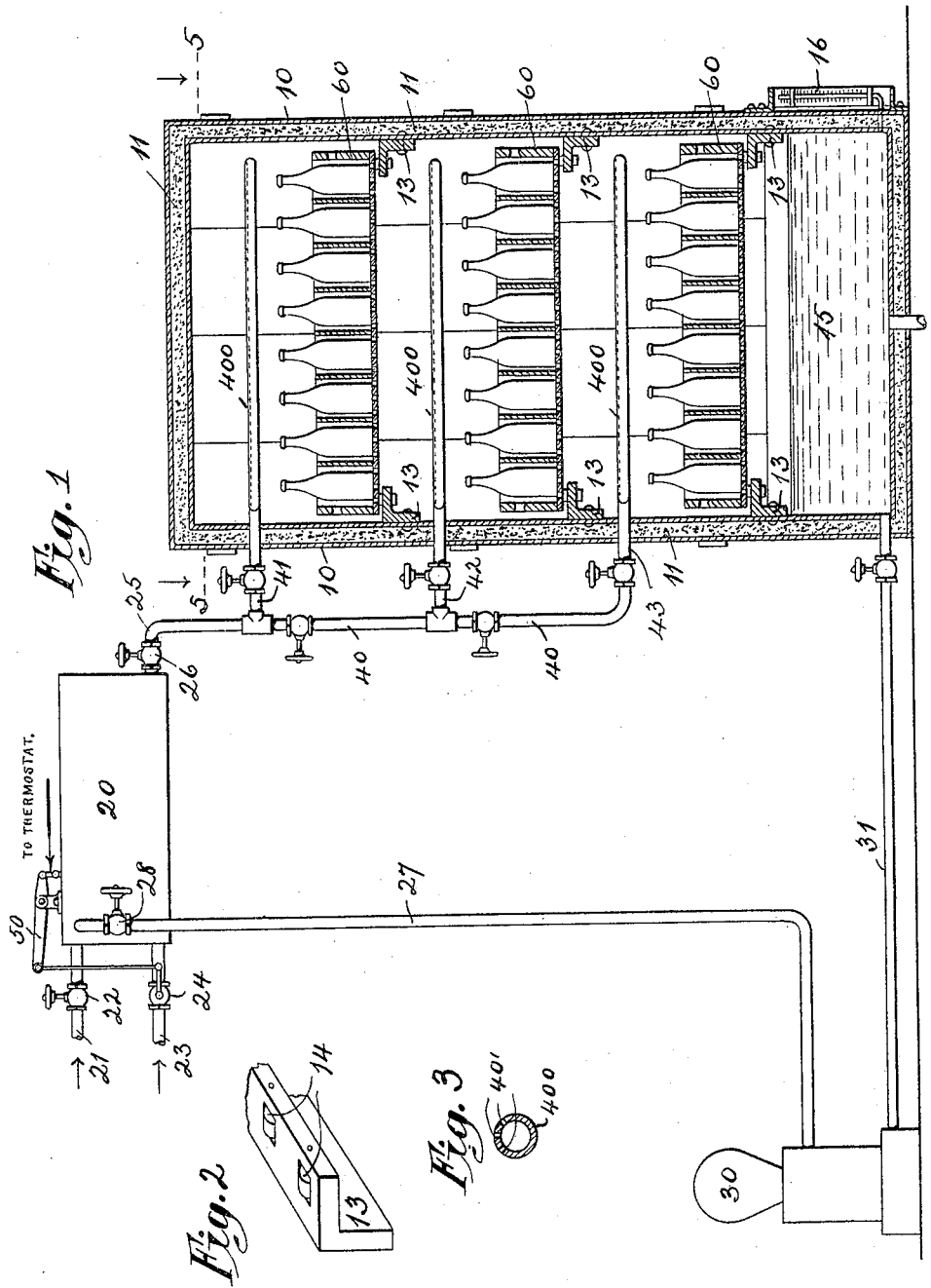

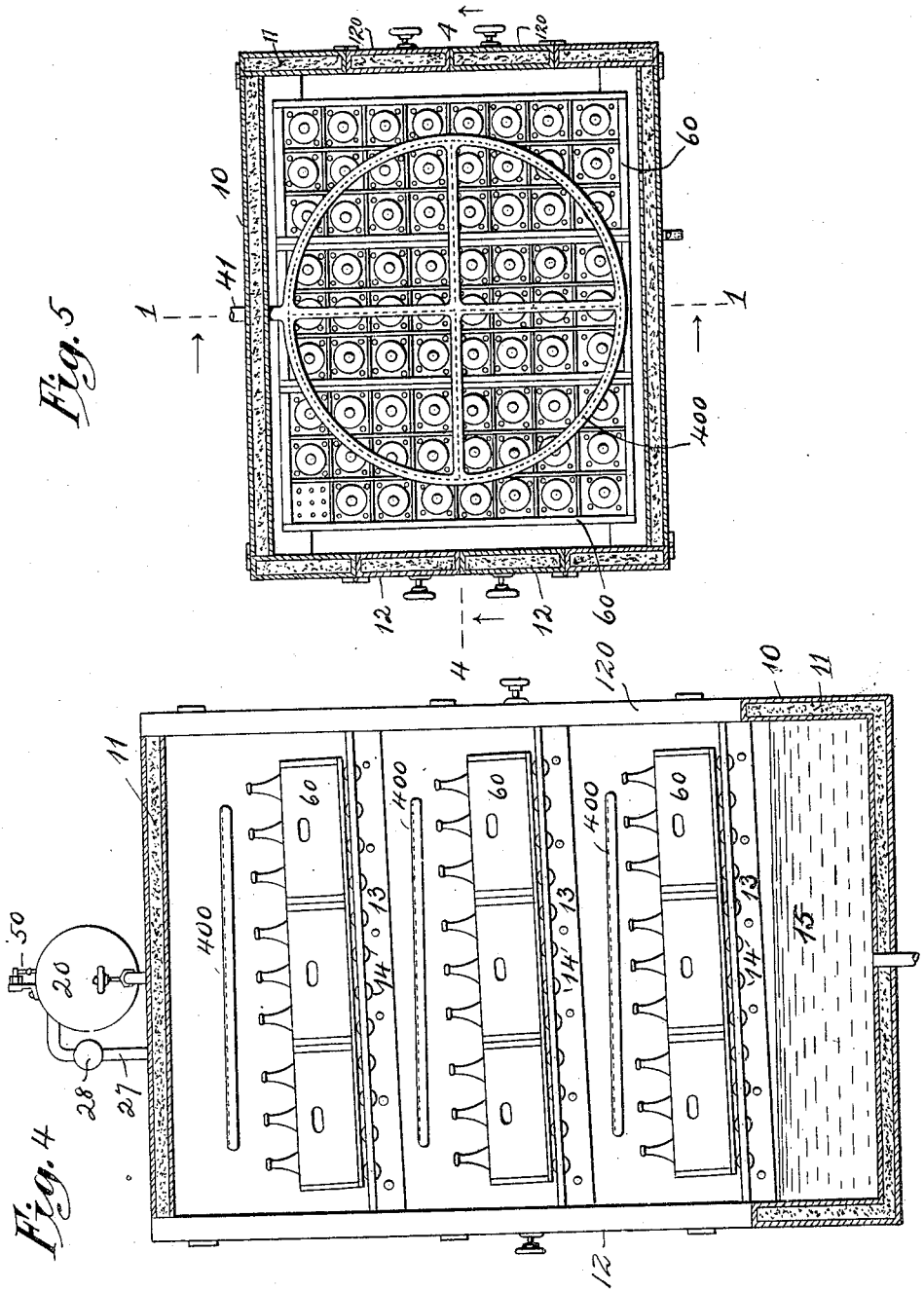

CHARLES H. LOEW, OF LAKEWOOD, OHIO.

PROCESS OF PASTEURIZING BEER.

No. 808,668. Specification of Letters Patent. Patented Jan. 2, 1906.

Application filed February 8, 1905. Serial No. 244,689.

*To all whom it may concern:*

Be it known that I, CHARLES H. LOEW, a citizen of the United States, residing at Lakewood, in the county of Cuyahoga and State of Ohio, have invented certain new and useful Improvements in Processes of Pasteurizing Beer, of which the following is a specification.

My invention relates to a process for the pasteurization of beer in bottles; and its novelty consists in the several successive steps of the process employed to effectuate the desired purpose.

The pasteurization of beer in bottles is accomplished effectually if the beer can be maintained a sufficient length of time—say from about twenty to thirty minutes—say, at about 145° Fahrenheit, which will prevent the further development of the yeast in the beer. A higher temperature must be avoided, as it cooks the beer, and a lower temperature is not efficient. Beer has usually been pasteurized of late years by conveying the bottles containing it either singly or in groups through a suitable pasteurizing medium—for instance, hot water. It must be remembered that beer is bottled usually at a temperature of 36° Fahrenheit or thereabout. Consequently conveying the bottles directly into water of the necessarily much higher temperature causes breakage by reason of the sudden shock to the glass of which the bottles are composed. Breakage under these circumstances means not only the direct loss of the beer in the bottle and to the bottle itself, but it also means a contamination of the pasteurizing medium with the beer, which from the acid contained therein injuriously affects the vessels or receptacles in which the operations are carried on. Attempts have been made to pasteurize beer in the bottles by two distinct methods. The first of these consisted in placing the bottles in a suitable vessel and then admitting heated water to the vessel, which as it gradually arose therein heated the bottles to the required temperature and as it was released and conducted therefrom allowed the bottles gradually to sink to a temperature equal to that of the outside atmosphere. The second method, which has been somewhat extensively employed, has been to pass the bottles through a bath of hot water by placing the same on an endless conveyer going through this bath. As above stated, the sudden changes of temperature which necessarily take place in this operation are apt to break the bottles.

I have had much experience in this art, and I have discovered that when the bottles filled with the comparatively cold beer are brought into the presence of a warmer vapor, even although it be not much warmer than the temperature of the beer, a fine film of moisture immediately forms on the outside of the bottles, and if a much warmer fluid is then brought into contact with the outside of such bottles they do not break, being protected by this film of condensed vapor on their surface. I have utilized this discovery and overcome the disadvantages heretofore existing in the processes of pasteurizing the beer by the process which is the subject-matter of this application and which process consists, in brief, in subjecting the bottles containing the beer to be pasteurized to a spray of water of gradually and progressively increasing temperature within a suitable chamber until a predetermined temperature sufficient to pasteurize the beer in the bottles has been arrived at, then maintaining the temperature of the spray at that temperature or one slightly above that point for a sufficient time to pasteurize the beer in the bottles, and finally allowing the bottles to cool, either naturally by withdrawing the spray, or by lowering the temperature of the spray gradually, but continuing it. By this process I avoid the expense, labor, and power necessary to convey the bottles through the pasteurizing medium, because they remain stationary within the chamber while the operation is going on. By a somewhat ingenious device I use the water with which the bottles have been sprayed over and over again, so that the expense of continually heating a fresh quantity of water to the proper point is avoided. I avoid the disadvantages existing where the bottles are brought into contact with the body of liquid in which at times they are only partially immersed. I secure an even temperature throughout the pasteurizing chamber, so that the beer in all the bottles contained in the chamber is subjected to the pasteurizing conditions substantially the same length of time, and I utilize as a pasteurizing medium water which has been preheated by the waste steam which is common in all breweries and bottling establishments.

In carrying out this process I make use of a preferred form of apparatus which is illustrated in the accompanying drawings, and in which—

Figure 1 is a front elevation and partial vertical section of the same. Fig. 2 is a perspective detail view of one of the brackets or slideways. Fig. 3 is a transverse section through one of the atomizing-nozzles. Fig. 4 is a vertical sectional view on the line 4 4 of Fig. 5, partly in elevation; and Fig. 5 is a horizontal sectional view on the line 5 5 of Fig. 1 looking downward.

In the drawings there is illustrated a box or chamber made of any suitable size and material, but preferably of steel, and the walls 10 of which are lined with suitable insulating material 11, as mineral wool. It is provided with doors 12 12 at one side and similar doors 120 120 at the other side. Along the walls are arranged brackets or slideways 13 13 in pairs, made of angle-iron or other suitable construction, and which dip slightly from one end of the chamber to the other to facilitate the travel toward the latter of boxes containing the beer-bottles. If deemed desirable, these slideways may be provided with little friction-rollers 14 14; but in most cases these would not be necessary. The bottom portion 15 of the chamber comprises a water-tank, and it is provided with an external water-gage 16. In close proximity to this chamber and preferably conveniently arranged above it is the water-tempering chamber 20. This consists of a closed vessel of steel or other suitable material and having a capacity of several gallons. It is provided with a water-supply pipe 21, having a valve 22, a steam-supply pipe 23, having a valve 24, a spraying-system pipe 25, having a valve 26, and a pump-pipe 27, having a valve 28. The pipe 21 may be connected to any suitable source of water-supply (not shown)—as, for instance, a city main or reservoir. The pipe 23 may be connected with the exhaust system of the steam-engine or with any other source of steam under pressure. Also in close proximity to the pasteurizing-chamber is a pump, (indicated at 30,) which may be of any suitable form or size and which is connected to the reservoir 15 at the bottom of the chamber 10 by a pipe 31 and to the water-tempering chamber 20 by another pipe 27, above referred to.

Arranged alongside of and partly within the pasteurizing-chamber is the spraying system. This comprises the pipe 25, leading from the chamber 20 to the vertical pipe 40, which is provided with branches 41 42 43, which are each supplied with a suitable valve and each of which terminates in an atomizing nose or nozzle 400, whereby the water coming through the branch pipe and supplied thereto is projected upward in the form of a fine spray.

A thermostat of any approved form is arranged in close proximity to the water-tempering chamber and is so arranged that it controls the valve 24 of the steam-supply pipe 23, (through a lever 50,) so that if the temperature of the water in the chamber 20 arises above the point at which the thermostat is set the valve 24 will be shut to cut off the supply of steam, and if the temperature falls below that point the valve is opened to admit the steam thereto. Such thermostats are well known, and its special construction and mode of operation form no part of this invention.

The boxes 60, containing the beer in bottles, are simple trays divided into compartments, each of the latter being adapted to hold one bottle. The trays, however, must have a perforated bottom to permit of the water with which the bottles are sprayed to drip therefrom. Woven wire forms a good material for these boxes or trays; but their form and material are unimportant so long as they hold the bottles safely and allow the water to pass downward from them.

The mode of using the apparatus is as follows: The doors 12 12 are closed and the doors 120 opened. The workmen place the boxes containing the beer-bottles upon the slideways and the boxes slide down to the other side of the apparatus. This is continued until the pasteurizing-chamber is all filled. The doors 120 120 are then closed. The valves 22 and 26 and the valves on the branch pipes 41, 42, and 43 are then opened and water from the pipe 22 flows into the water-tempering chamber 20 until it is filled and water begins to flow into the spraying system through the pipe 40 and is forced through the nozzle 400 upward and striking against the roof of the pasteurizing-chamber or the bottoms of the bottle-boxes, as the case may be, falls upon the bottles within the boxes in the form of a fine rain or spray and begins to accumulate in the reservoir or tank 15, its depth being ascertained by an inspection of the water-gage 16. The valve 24 is then opened and connected with the thermostat 50, and as soon as the water in the tank 15 nearly fills the latter the pump 30 is started and begins to pump the water from the tank 15 through the pipe 31, pump 30, and pipe 27 back into the water-tempering chamber 20, where it is again heated by the steam and used over again through the spraying system. By these steps it will be observed that the spray first falling upon the bottles is of a temperature of the water in the supply-pipe 21. The steam warms these gradually as it circulates through the tempering-chamber 20 until a point is reached where it is kept at the temperature desired by the action of the thermostat. This latter should be set at a temperature a few degrees higher than that at which it is desired to keep the beer in the bottles to allow for inevitable losses by radiation and conduction. After the proper temperature has been maintained long enough the thermostat is disconnected and the steam shut off, but the pump 30 is kept in operation constantly to spray the bottles with the water, which gradually becomes cooler and finally reaches the normal temperature. The pump is then stopped. The doors 12 12 are then opened and the boxes removed.

It will be observed, using the apparatus in the manner described, that the bottles containing the beer have been first sprayed with a fine rain or spray of water at a temperature near the normal, that this temperature has been gradually increased until the pasteurizing temperature has been reached, and that the latter temperature has been maintained until the pasteurization has been effected, when the temperature has been gradually decreased. These steps, moreover, have been effected in such a way as not to produce any sudden changes in temperature, and consequently there has occurred no breakage of the bottles. The bottles have remained stationary during the operation, and no power has been required to move them. The only expense attendant upon the operation is that of the steam employed to heat the water and the cost of running the pump. Both of these are small. Using the water over and over effects a great economy, because it is pumped from the collecting or drip tank back to the tempering-chamber before it has time to lose much of its heat. The temperature within the pasteurizing-chamber is practically uniform.

Having described my invention, what I claim as new is—

1. The process of pasteurizing beer in bottles which comprises subjecting the bottles contained in a suitable chamber to a spray of water of progressively-increasing temperature until a predetermined temperature is arrived at.

2. The process of pasteurizing beer in bottles which consists in subjecting the bottles contained in a suitable chamber to a spray of water of progressively-increasing temperature until a predetermined temperature is arrived at and maintaining the spray at the chosen temperature for a sufficient time to pasteurize the beer in the bottles.

3. The process of pasteurizing beer in bottles which consists in subjecting the bottles contained in a suitable chamber to a spray of water of progressively-increasing temperature until a predetermined temperature is arrived at, maintaining the spray at the chosen temperature for a sufficient time to pasteurize the beer in the bottles, and finally subjecting the bottles to a spray of a gradually-decreasing temperature.

4. The process of pasteurizing beer in bottles which comprises subjecting the bottles contained in a suitable chamber to a spray of water of progressively-increasing temperature until a predetermined temperature is arrived at, and securing said increasing temperature by repeatedly passing the water so used for the steam-heating medium.

5. The process of pasteurizing beer in bottles which comprises subjecting the bottles contained in a suitable chamber to a spray of water of progressively-increasing temperature until a predetermined temperature is arrived at, and securing said increase of temperature by repeatedly passing the water so used through a water-tempering chamber provided with a suitable source of heat.

6. The process of pasteurizing beer in bottles which comprises subjecting the bottles contained in a suitable chamber to a spray of water of progressively-increasing temperature until a predetermined temperature is arrived at, and securing said increase of temperature by repeatedly passing the water so used through a water-tempering chamber provided with a suitable source of heat, and providing means for governing the admission of heat energy to the tempering-chamber.

7. The process of pasteurizing beer in bottles which consists in subjecting the same to the action of a spray of water at or near the normal temperature, heating the water-supply to the spray gradually to a predetermined temperature, maintaining the temperature of the water a predetermined suitable time, and withdrawing the heat therefrom after the lapse of said time.

8. The process of pasteurizing beer in bottles which consists in placing the same in a suitable closed chamber, subjecting the same to the action of a spray of water, which water has previously been heated in a tempering-chamber, returning the water after it has been brought into contact with the bottles to the tempering-chamber, gradually raising the temperature of said tempering-chamber until the spray falls in upon the bottles at a predetermined temperature and maintaining that temperature a suitable length of time at such degree of warmth that the beer within the bottles will be pasteurized.

In testimony whereof I affix my signature in presence of two witnesses.

CHAS. H. LOEW.

Witnesses:
FRED. H. BIERMANN,
EMMA L. HARMON.